Patented Jan. 5, 1932

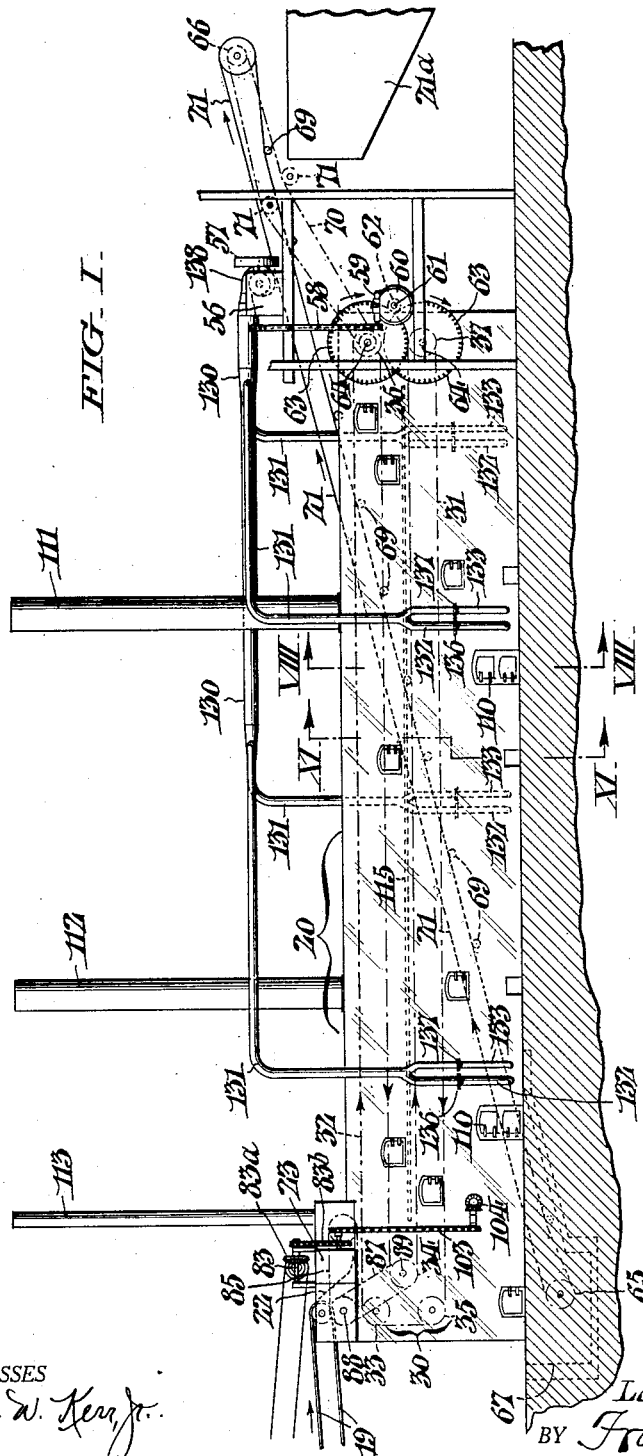

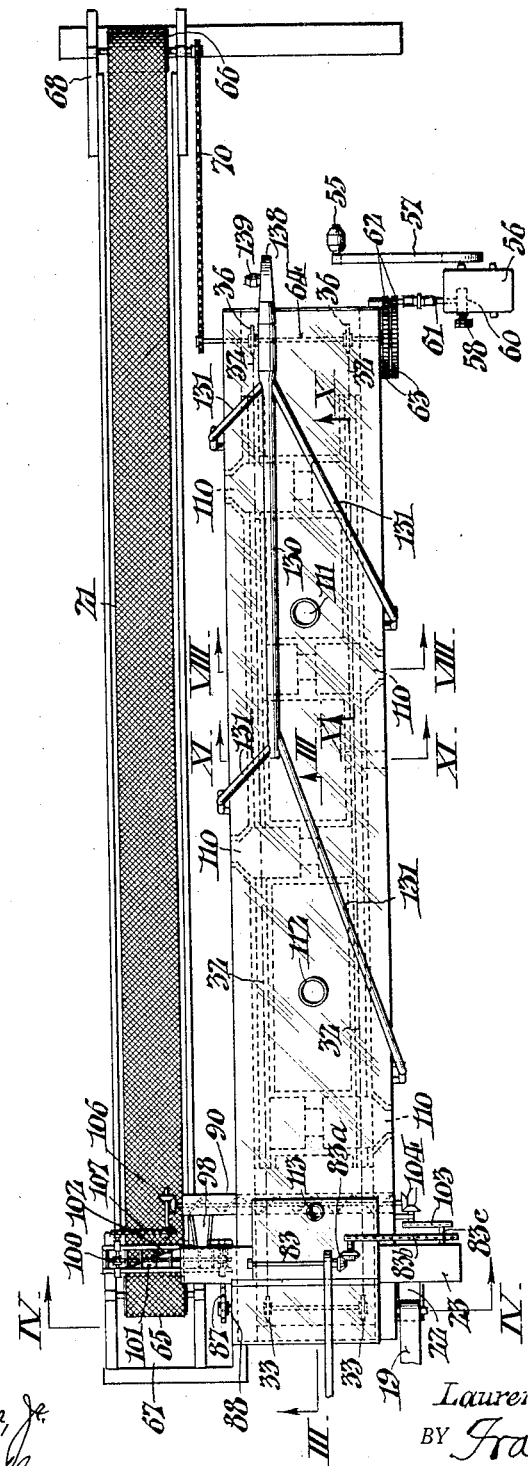

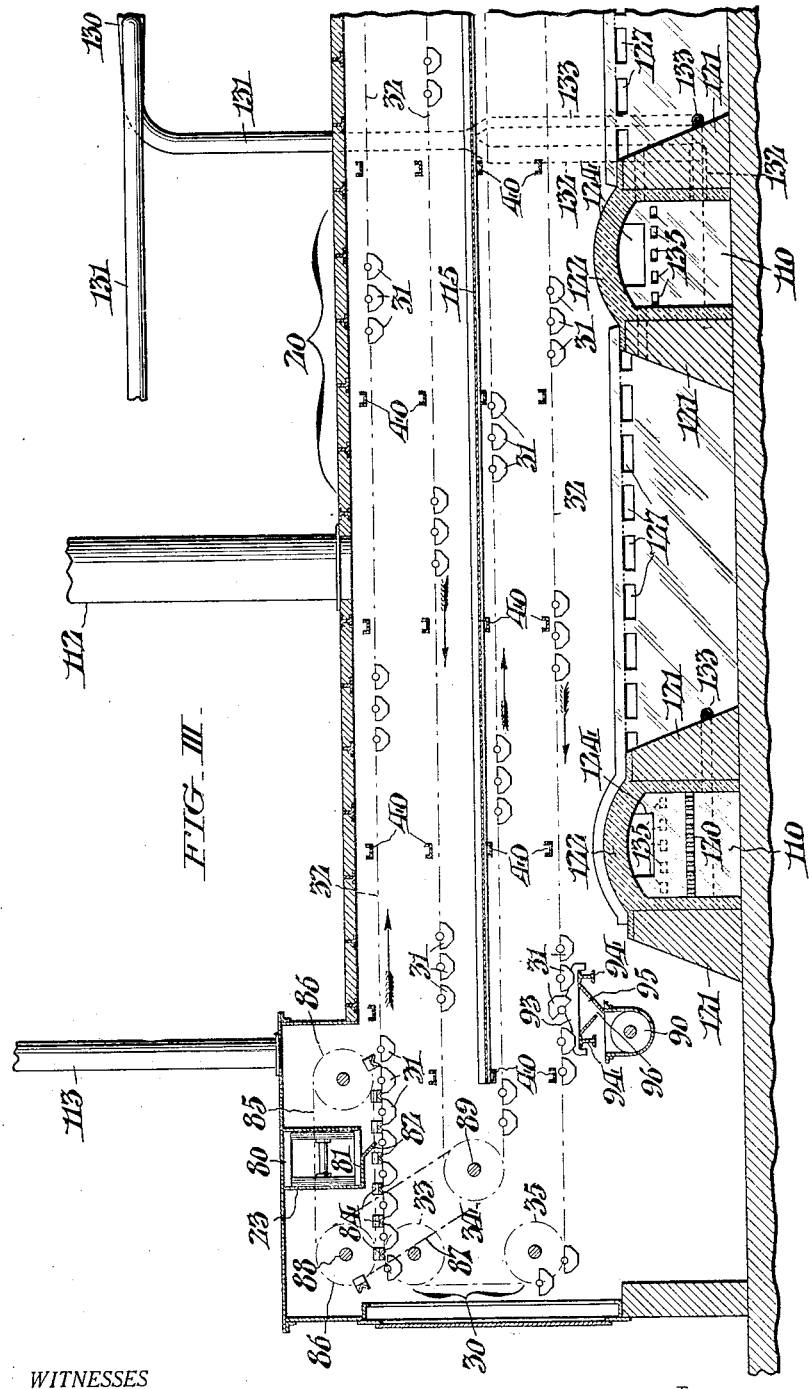

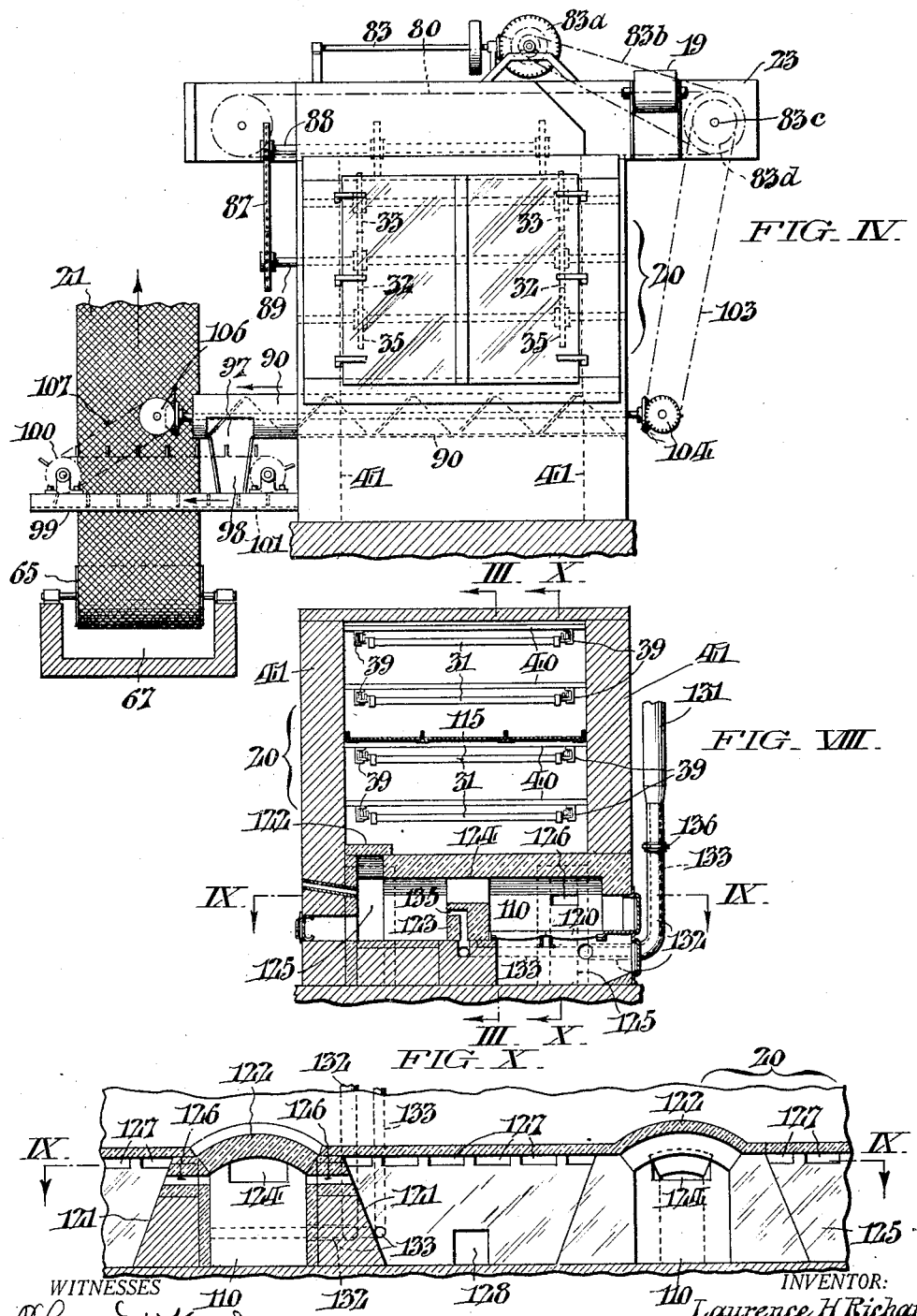

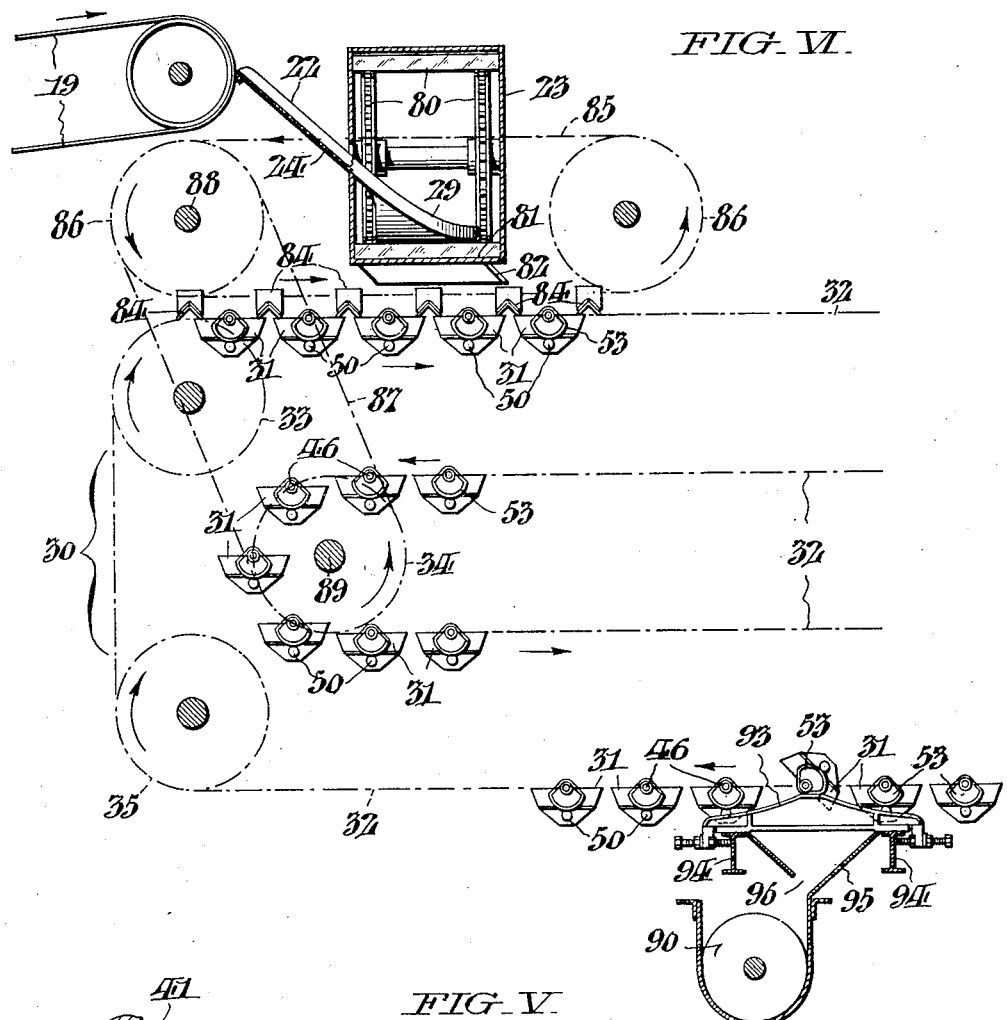

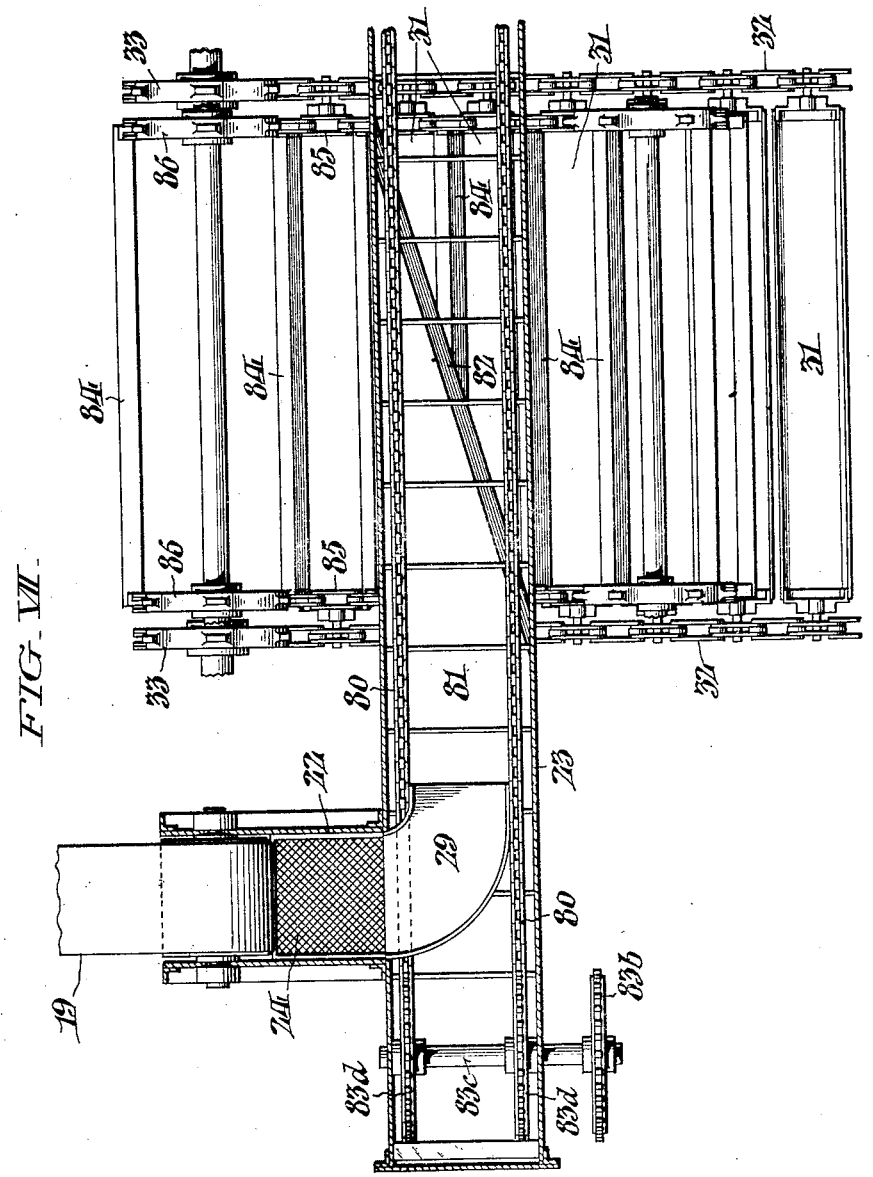

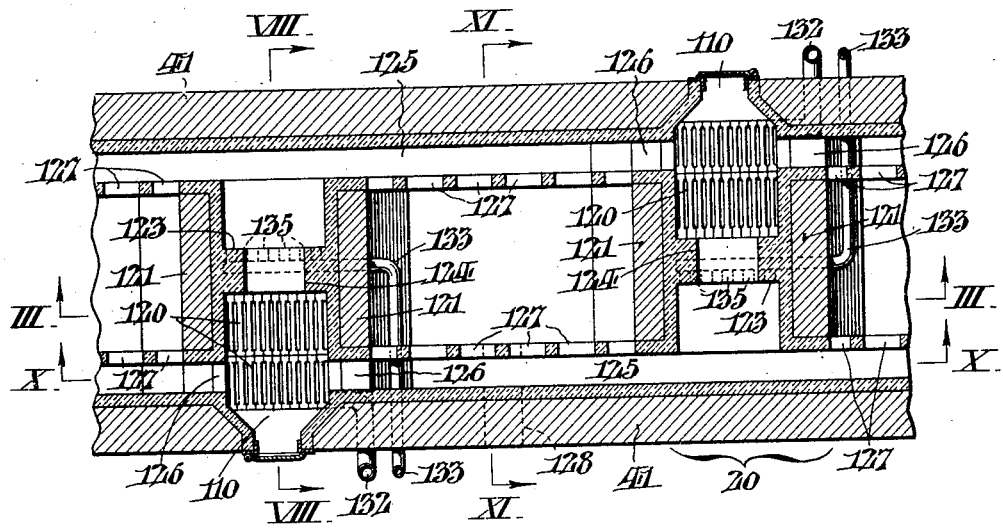

1,840,294

UNITED STATES PATENT OFFICE

LAURENCE H. RICHARDS, OF POTTSVILLE, PENNSYLVANIA, ASSIGNOR TO THE PHILADELPHIA & READING COAL AND IRON COMPANY, OF POTTSVILLE, PENNSYLVANIA, A CORPORATION OF PENNSYLVANIA

FUEL BRIQUETTE TREATING APPARATUS

Application filed May 19, 1927. Serial No. 192,680.

This invention relates to fuel briquette treating apparatus and the like, the object being to provide for baking or firing fuel briquettes and afterward cooling them, etc. (if desired) conveniently and under favorable conditions. In suitable forms of embodiment, such as hereinafter described, the invention permits of accurate regulation and wide variation of the conditions of treatment, and affords great economy and efficiency in the handling of the material. Other objects and advantages that may be realized through, or in connection with, the invention will appear from the description hereinafter of a particular form of embodiment.

The invention is well adapted and advantageous for the production of smokeless anthracite briquettes, and particularly for baking raw briquettes made of anthracite culm crushed to pass a 10 to 12 mesh Tyler standard screen, and pressed up with a bituminous (asphaltic) binder,—after thorough intermixture with the aid of heat. An asphaltic residue from petroleum distillation may be used as binder, known in the trade as "heavy asphalt flux", in the proportion of about 5½% of the coal by weight. This is for coal cleaned before crushing (as at the stage of wet slush), so as to have an ash content of about 13 to 15%, and containing all the sizes produced in crushing it, including at least about 30% "pulverized",—i. e., finer than about sixty mesh. While the coal may be dried before crushing, in mixing it may be moistened so that the raw pressed briquettes will contain about 2% moisture when they go from the press to the baking oven. They may be of such size as to weigh about 2 oz. before baking, and to have a final (baked) size of 1¾ in. square by 1⅛ in. thick for a "stuffed pillow" form of briquette.

In baking such briquettes in the manner hereinafter described, their asphaltic binder is carbonized, undesirable volatile components are expelled, and the material is consolidated into strong coherence. They may then be allowed to cool to a temperature at which they can be handled, with concurrent further expulsion of some volatiles. Their final weight may be about 1¾ oz.

In the drawings, Fig. I is a side view of a baking oven and a cooling conveyor suitable for treating fuel briquettes in accordance with my invention.

Fig. II is a plan view of the oven and the conveyor.

Fig. III shows a vertical longitudinal section through one end of the oven, taken substantially as indicated by the line III—III in Figs. II, VIII and IX.

Fig. IV is a view of the oven and part of the cooling conveyor in end elevation, from the left of Figs. I and II, certain parts appearing in section, however, as indicated by the line IV—IV in Fig. II.

Fig. V is a fragmentary cross sectional view, illustrating the construction and support of the oven conveyor shown in Fig. III.

Fig. VI is a fragmentary and partly diagrammatic side elevation of the oven conveyor and its bucket loading and unloading mechanisms, with certain parts partly broken away or in section.

Fig. VII is a fragmentary plan view of the oven conveyor and its bucket loading mechanism.

Fig. VIII shows a cross section through the oven and one of the furnaces by which it is heated, taken as indicated by the line VIII—VIII in Figs. II and IX.

Fig. IX shows a horizontal section through the lower portion of the oven including two of its furnaces, taken as indicated by the line IX—IX in Fig. VIII.

Fig. X shows a vertical longitudinal section through the lower portion of the oven and through its furnaces, taken as indicated by the line X—X in Figs. VIII, IX and XI; and Fig. XI shows a transverse vertical section through the oven, taken as indicated by the line XI—XI in Figs. II and IX.

The raw briquettes may be conveyed from the press (not shown) where they are pressed up out of the mixed coal and binder, on a rubber belt conveyor 19, the right hand end of which appears in Figs. I, II, VI and VII, in front of and at the top of the oven 20. They enter and leave the oven 20 at its left-hand end, Figs. I, II, III and IV. From the oven 20, the briquettes are delivered onto one end of a cooling conveyor 21, of wire mesh or other open work construction, here shown as sloping upward from a point at the lefthand end of the oven 20 and slightly below it to a point considerably beyond and above the righthand end of said oven. In practice, the oven 20 may be some 70 feet long, and the cooling conveyor some 15 or 20 feet longer still. As shown in Fig. I, the cooling conveyor 21 raises the briquettes to a point where they may fall from its end into a gondola car or other hopper or receptacle 21a placed to receive them.

From the righthand end of the transfer conveyor 19, the briquettes tumble and slide down an inclined chute 22 in a lateral extension of a transverse trunk or housing 23, extending across the interior of the oven 20 in its upper portion, which is here built higher than elsewhere (Figs. I, II, IV, VI and VII). The chute 22 has a wire mesh or openwork portion 24 (Fig. VII), through which any loose particles of the briquette material may fall and thus be separated from the briquettes and recovered before entering the oven 20. The briquettes themselves slide on down the 90° curved lower portion 29 of the chute 22 into the trunk 23.

As shown in Figs. I, II, III, IV, VIII and XI, the oven 20 is a long high tunnel-like structure, suitably heated as hereinafter described, in which the briquettes are baked into coherence by carbonization of their binder, with expulsion of volatile components. The briquettes are carried through the oven 20, in a plurality of longitudinal passes, by a conveyor system 30 (Figs. I, III and VI) comprising buckets 31 pivoted to chains 32 that extend around pairs of sprockets 33, 34, 35 at the lefthand end of the oven and pairs of sprockets 36, 37 at its righthand end. As shown in Figs. I, III and VI, the conveyor system 30 has four passes or "runs" back and forth from end to end of the oven 20, one below the other successively, with a short vertical return pass or run between the lowermost and uppermost lefthand sprockets 35, 33. As shown in Figs. V, VIII and XI, the horizontal runs of the sprocket chains 32 are supported by ways formed by the horizontal flanges of angle bars 38 mounted on brackets 39 carried by transverse beams 40 (of channel section, horizontally arranged) whose ends are built into and supported in the lateral furnace walls 41. One end of each beam 40 rests on a plate 42 built into one wall 41 and is anchored fast in said wall by a headed pin 43 extending down through the channel web and the plate 42, while its other end is loosely accommodated in a metal housing 44 built into the other wall 41,—this arrangement permitting free and independent expansion and contraction of the beams 40 and of the furnace structure. The sprocket chains 32 may be anti-frictionally supported on the ways 38 by rollers 45 mounted on the pivotal connections between the chain links. The buckets 31 may be pivotally supported by trunnions 46 whose ends extend through the chain links and are secured by cotter pins 48.

As shown in Figs. V and VII, a typical bucket 31 comprises a shallow flat bottomed sheet metal trough with sloping sides and flanged end pieces 47 riveted to the trough ends and carrying the trunnions 46,—here shown as removably secured in said trough ends by the cotter pins 48. The buckets 31 may be weighted to keep them upright at all stages of their travel, as by means of round bars 50 with their ends engaged in apertured depending flanges of transverse angle clips 51 riveted to the bucket bottoms. The weights 50 may be removably secured by cotter pins 52 in diametral holes in opposite ends of the bars 50, inside of the clips 51. The bucket ends 47 are shown as provided with cam flanges 53 for tilting or capsizing the buckets 31 to unload them, as hereinafter described.

As shown in Figs. I and II, the conveyor 30 may be driven by an electric motor 55 through a variable speed connection or device 56 to one or both of the righthand pairs of sprockets 36, 37. In the present instance, the motor 55 has a belt connection 57 to the variable speed drive 56, and the latter has a chain and sprocket connection 58 to a worm 59 in mesh with a worm gear 60 on a transverse countershaft 61 carrying pinions 62, which mesh with gears 63, on the shaft 64, of the pairs of sprockets 36, 37.

As shown in Figs. I and II, the cooling conveyor 21 consists of a wire mesh belt extending around drums 65, 66 at its lefthand and righthand ends, the former 65 being mounted in a pit 67 sunk below the floor on which the oven 20 is built, and the latter 66 supported by a suitable frame structure 68. The lower, return run of the cooling conveyor 21 may be supported by a plurality of idle rolls 69 at suitable intervals therebeneath. As shown in Figs. I and II, the conveyor 21 is driven at its upper righthand end, by a sprocket chain connection 70 from a rearward extension of one of the sprocket shafts 64 to the shaft of its righthand drum 66. The sprocket chain 70 is kept up and out of the way of the receptacle 21a by idler sprockets 71.

As shown in Figs. III, VI and VII, the curved lower end 29 of the chute 22 extends between the upper and lower runs of a sprocket chain and paddle conveyor 80 in the transverse trunk 23, and the briquettes fall from the chute end 29 into the substantially horizontal troughway afforded by the bottom of the trunk 23, in the path of the lower run of the conveyor paddles. The trunk 23 and its troughway extend clear across the oven 20 above the uppermost run of the conveyor 80 at the left, and said conveyor 80 carries and pushes the briquettes along the trough bottom 81 into and across the oven 20, where they are loaded into the conveyor buckets 31. The troughway bottom 81 is not of full width all the way across the interior of the oven 20, but of progressively diminishing width: i. e., it tapers off at one edge 82 diagonally across the oven and said troughway. As shown in Figs. VI and VII, this edge 82 terminates in a sloping apron from which the briquettes drop into the passing buckets 31. By virtue of the diagonal termination of the trough bottom 81 at 82, and of the fact that the paddles of the conveyor 80 lie substantially at right angles to their direction of travel, the falling briquettes are distributed substantially uniformly from end to end of the buckets 31. Independently of the tapering bottom at 82, indeed, the paddles act to distribute or spread the material across the width of the bucket conveyor 30, by always pushing forward the top of material piling up on the conveyor 30. As shown in Figs. I, II and IV, the conveyor 80 is driven from a belt-driven countershaft 83 on top of the oven 20, by bevel gear and sprocket connections 83a, 83b to the shaft 83c of its front sprockets 83d.

Briquettes may be prevented from falling through the intervals between the buckets 31 by transverse cover bars 84 (shown in Figs. III, VI and VII, as of angle section with their angles turned upward) that are carried by sprocket chains 85 extending parallel with the conveyor chains 32 around pairs of sprocket wheels 86, mounted in the oven 20, above the uppermost run of the conveyor 30. As shown in Figs. I and II, the sprocket chains 85 and cover bars 84 are driven in definite phase or step with the oven conveyor chain 32, by means of a sprocket chain connection 87 between the shaft 88, of the right-hand sprockets 86, and a rearward extension of the shaft 89, of the intermediate oven sprockets 34. Thus the cover bars 84 always move over the intervals between adjacent edges of the buckets 31, as shown in Figs. III, VI and VII, and so assist in the distribution of material lengthwise of the buckets 31 by the paddles.

The baked briquettes are received from the lowermost run of the oven conveyor 30 and discharged at the rear of the oven 20 by an endless-screw and trough conveyor 90 extending across the oven 20 beneath the lowermost conveyor run, as shown in Figs. II, III, IV and VI. As the oven conveyor buckets 31 reach this screw conveyor 90, they are tipped and dumped, as shown in Figs. III and VI, by a stationary cam 93, adjustably mounted on beams 94 across the oven 20, which engages the cams 53 on the bucket ends 47 (Figs. III and VI). As shown in Fig. VI, the inclined surface of the cam 93 first engages the circumferential portion of the advancing sector shaped bucket cam 53 (shown concentric with the trunnion 46) and rolls the same rearward, at the same time lifting the bucket 31 somewhat, and then engages against the terminal or radially extending edge of the cam 53 as the latter slides over the crest of the stationary cam 93. As shown in Figs. III and VI, a transverse trough or hopper 95, with a bottom opening 96 extending its full length, is interposed between the lowermost oven conveyor run and the trough conveyor 90, to catch the falling briquettes and insure their all reaching the trough of said conveyor 90.

At the rear of the oven 20, the discharge conveyor 90 has a closed cylindrical casing with a lateral outlet 97 (Fig. IV), from which the briquettes tumble or slide down an inclined open chute 98 into a substantially horizontal transverse open troughway 99 extending rearward from the oven 20 across the lower end of the cooling conveyor 21. In this troughway 99 operates a sprocket chain and paddle conveyor 100 similar to the conveyor 80 in the trunk 23, that carries and pushes the briquettes rearward over and across the cooling conveyor 21. The bottom 101 of the troughway 99 terminates at 102 Fig. II on a diagonal extending clear across the cooling conveyor 21, just like the trough bottom 81 above described, and thus the briquettes falling from the edge 102 are distributed substantially uniformly across the width of the cooling conveyor belt.

As shown in Figs. I, II and IV, the trough screw conveyor 90 is operated by sprocket chain and bevelled gear connections 103, 104 from the sprocket shaft 83c of the paddle conveyor 80. The paddle conveyor 100 is driven from the other end of the conveyor screw 90 through bevelled gear and sprocket chain connections 106, 107, as shown in Figs. II and IV.

The oven 20 may be heated from any suitable source and by any suitable means. As shown in Figs. I, II, III, VIII, IX, X and XI, the oven 20 is heated by a plurality of (anthracite) coal-fired furnaces 110 in its lower portion, beneath the lowermost run of the oven conveyor 30. In the present instance, there are four such furnaces 110, extending transversely of the oven 20, and alternate furnaces are fired from opposite sides of said oven. The products of combustion from these furnaces 110 leave the oven 20 through a plurality of stacks 111 and 112 in its roof, and also through a smaller stack 113 in the roof of the portion that houses the conveyor loading apparatus. The furnace gases are prevented from rising directly to the stacks 111, 112 and 113, by a substantially horizontal baffle 115 across the interior of the oven 20, extending to within some distance (approximately about half the greatest internal height of the furnace) of either end thereof. As shown in Figs. III and XI, this baffle 115 is interposed between the second and third conveyor runs, so that the lower runs (the third and fourth) receive gases at their hottest, while the upper runs receive them only after they have been cooled by contact with the buckets 31 and briquettes below said baffle. The gases circulate lengthwise of the oven 20, toward either end below the baffle 115, and from its ends toward the stacks 111, 112 and 113, in its mid-portion above this baffle. Thus the briquettes are subjected to the gases on the countercurrent principle, so that the coldest gases act on the incoming briquettes, and the hottest gases act on the briquettes in the later stages of the baking process.

As they enter the oven 20, the briquettes may have a temperature of about 100° F. For briquettes made as above described, the oven 20 will preferably be so operated as to have a temperature of about 300° F. where the briquettes are introduced and throughout the first horizontal conveyor run or pass (from left to right). On the second conveyor run or pass, the temperature may then be about 400–450° F.—the higher temperature being partly due to the influence of the baffle 115 and the hotter gases beneath it, and partly to the cooling of the gases by the briquettes in the two upper conveyor runs. In the third and fourth conveyor passes or runs, the temperature may be about 600° F. Under these conditions, the time of transit of the briquettes through the oven 20 may be about an hour and three quarters. However, it will be understood that by means of the variable speed device at 56 (Fig. II), the time of transit may be regulated within very wide limits, according to the oven temperatures and the character or composition of the briquettes,— e. g. from fifteen minutes or less to two hours or more.

Briquettes produced as above described and baked under the particular oven conditions of temperature and time just mentioned will ordinarily reach the cooling conveyor 21 at a temperature of about 600° F., and may cool on it to a temperature at which they can be handled. In the early portion of their travel on this conveyor 21, some smoke and odor may distill off from the briquettes; while their travel on it may last about 29 to 30 minutes. However, this admits of wide variation, even for the same composition and baking conditions of the briquettes.

The details of the furnace structure are best illustrated in Figs. I, II, III, and VIII–XI. As shown in these views, and particularly in Figs. III, VIII, IX and X, each of the furnaces 110 comprises a grate 120 between refractory side walls 121, with a refractory arch 122 thereover. At the rear end of the grate 120 (speaking with reference to the side of the oven 20 from which the furnace 110 is fired) is a refractory bridge wall 123 with an outlet 124 in or over its upper portion for the escape of the products of combustion rearward. Along the sides of the oven 20, at the bottom, are refractory longitudinal flues 125, substantially closed except as hereinafter described. As shown in Fig. IX, each of the furnaces 110 opens and discharges directly into one of the flues 125 at its rear end. Also, there are lateral openings 126 through the side walls 121 of each furnace fire chamber into one of the flues 125. Each of the flues 125 has a series of lateral openings 127 from its upper portion into the interior of the oven 20,—i. e., into the interior of the space between the flues 125,—and also a lateral opening 128 through its lower portion into the space between said flues. Thus the hot gases from the furnaces 110 are conveyed lengthwise of the oven 20 by the flues 125, and discharged and distributed substantially uniformly into the oven 20 through the openings 127 and 128. In addition, the interior of the oven 20 is heated by radiation from the furnace 110 and flue structures 125, especially from the furnace arches 122.

As shown in Figs. I, II, III, VIII, IX and X, there is a forced draft system for supplying the furnaces 110 with air for combustion, comprising a longitudinal air pipe 130 above the oven 20, with diagonal branches 131, to either side for the furnaces 110. In the present instance, the air pipes 131 extend down outside the oven 20, dividing at an intermediate point into branches 132, 133. Of these, the branch 132 extends and opens into the furnace ash pit, so as to deliver air for combustion beneath the grate 120, while the other branch 133 extends rearward and then into and up through the bridge wall 123, so as to deliver air rearward from the latter at 135. The flow of air through the branches 132 and 133 may be controlled, regulated, and proportioned by means of valves 136, 137 in said pipes 132, 133, respectively. By regulating the air supplied from these pipes 132, 133, the rate of combustion can be controlled, and also the temperature of the products of combustion can be regulated,—especially by supplying a greater or less excess of air through the bridge wall outlets 135. As shown in Figs. I and II, air is supplied to the main pipe 130 by a blower fan 138, driven by an electric motor 139.

Having thus described my invention, I claim:

1. The combination with a conveyor comprising a series of buckets, of a trough with a sprocket chain and paddle conveyor extending across and over said bucket conveyor for loading the same with material, means preventing material from falling between the conveyor buckets, and a chute for introducing material between the upper and lower runs of the paddle conveyor.

2. The combination with a conveyor comprising a series of buckets, of a trough with a paddle conveyor extending across and over said bucket conveyor for loading the same with material, progressively diminishing means for distributing the material uniformly from end to end of the conveyor buckets, means for preventing the material from falling between the oven conveyor buckets, and a chute for dropping the material into the trough between the paddles.

3. The combination with a bucket conveyor, of a trough having a progressively diminishing taper section with a paddle conveyor extending across and over said bucket conveyor for loading the same with material, and a chute with a downwardly-inclined curved section to feed the material into the trough between the paddles for uniform distribution from end to end of the conveyor buckets by the trough tapering section aforesaid.

4. The combination with a conveyor comprising a series of separate buckets, progressively-diminishing means for dropping material uniformly from end to end into said buckets, and means moving with the buckets in the region of said dropping means effective to prevent material from falling between said buckets.

5. The combination with a conveyor comprising sprocket chains and a series of transverse buckets carried thereby, of a progressively tapered sloping apron for dropping material uniformly from end to end into said buckets, a series of covers for the intervals between said buckets, and sprocket chains carrying said covers driven in phase with the conveyor chains.

6. The combination with a briquette oven conveyor comprising a series of tiltable buckets, of a trough with a paddle conveyor extending across and over the first-mentioned conveyor for loading the same with briquettes, means for preventing the briquettes from falling between the oven conveyor buckets, a trough conveyor extending transversely of the first-mentioned conveyor beneath the same, means for tilting and dumping the passing buckets and delivering the briquettes to said trough conveyor, and a cooling conveyor receiving the briquettes from the trough conveyor.

7. The combination with a conveyor comprising a series of tiltable buckets, of a trough having a progressively tapered section with a paddle conveyor extending across and over the first-mentioned conveyor for loading the conveyor buckets evenly from end to end with material, a trough conveyor extending transversely of the first-mentioned conveyor beneath the same, and adjustably-mounted stationary cam means for tilting and dumping the passing buckets and delivering the material to said trough conveyor.

8. The combination with a conveyor, of a trough extending transversely with respect thereto, and a paddle conveyor in said trough extending across and over said first-mentioned conveyor so that the paddles may distribute material from the trough across the width of the first-mentioned conveyor.

9. The combination with a conveyor comprising a series of buckets, of a trough extending transversely with respect to said bucket conveyor, a paddle conveyor in said trough extending across and over said bucket conveyor, for loading the same with material, and means for preventing the material from falling between the buckets, so that the material may be spread and distributed lengthwise of the buckets by the paddles.

In testimony whereof, I have hereunto signed my name at Pottsville, Pennsylvania, this tenth day of May, 1927.

LAURENCE H. RICHARDS.